United States Patent Office
2,847,444
Patented Aug. 12, 1958

2,847,444

THE BORATE OF METHYL ALPHA HYDROXYISOBUTYRATE

James H. Gardner, Weston, Mass., assignor, by mesne assignments, to Escambia Chemical Company, Pace, Fla., a corporation of Delaware No Drawing. Application August 25, 1955
Serial No. 530,620

3 Claims. (Cl. 260—462)

This invention relates to the production of chemicals and in particular to the production of alkyl borates.

The principal object of the present invention is to illustrate the preparation and properties of the new composition of matter, the borate of methyl alpha hydroxyisobutyrate.

Another object of the present invention is to provide a method for the preparation of the above borate.

Still another object of the invention is to provide a method for the preparation of alkyl borates.

Other objects of the invention will in part be obvious and will in part appear hereinafter.

The invention accordingly comprises the product possessing the features, properties and the relation of components, and the process involving the several steps and the relation and the order of one or more such steps with respect to each of the others which are exemplified in the following detailed disclosure, and the scope of the application of which will be indicated in the claims.

For a fuller understanding of the nature and objects of the invention, reference should be had to the following detailed description.

Heretofore, much difficulty and considerable confusion existed with regard to the preparation of alkyl borates. The present invention provides a simplified method for the preparation of such borates and in particular for the preparation of the borate of methyl alpha hydroxyisobutyrate.

In the present invention, a tertiary alkyl alcohol is reacted at elevated temperatures with a lower n-alkyl borate in the presence of a volatile liquid organic compound capable of forming low-boiling azeotropes with the lower alcohol produced during the reaction. The invention will be initially described in connection with the conversion of methyl alpha hydroxyisobutyrate to its borate without intending to limit the scope thereof.

The method of the present invention preferably comprises reacting at elevated temperatures, in a reaction zone, a mixture comprising methyl alpha hydroxyisobutyrate, methyl borate and pentane to produce the borate of methyl alpha hydroxyisobutyrate and methanol, continuously removing from the reaction zone the methanol-pentane azeotrope, and recovering the borate of methyl alpha hydroxyisobutyrate from the reaction zone.

The borate of methyl alpha hydroxyisobutyrate has been found to have considerable utility. For instance, it may be subjected to pyrolytic conditions so as to produce the valuable chemical compound, methyl methacrylate.

A specific detailed method of producing the borate of methyl alpha hydroxyisobutyrate is set forth in the following non-limiting example:

Example I 117 grams of methyl alpha hydroxyisobutyrate and 41.5 grams of methyl borate were dissolved in 300 grams of pentane and refluxed in a packed column. The take-off rate was adjusted so as to remove only the methanol-pentane azeotrope. After about 84 hours of refluxing, during which time the reflux ratio was progressively reduced from 20:1 to 200:1, the reaction was halted and the volatile liquids flashed. The residue was then distilled at about 350–400 microns Hg abs. through a column packed with long glass tubes. The principal cut, the borate of methyl alpha hydroxyisobutyrate, was a water-white, viscous liquid which is distilled over at 106°–108° C. The elemental analysis for this fraction was as follows:

|  | Found | Theoretical |
|---|---|---|
| Percent boron | 2.98 | 3.03 |
| Percent carbon | 49.2 | 49.8 |
| Percent hydrogen | 7.4 | 7.46 |

A yield of about 72% of the ester based on methyl alpha hydroxyisobutyrate was produced. The results of this reaction are surprising and unexpected in that the borate formation occurred exclusively rather than the polyesterification reaction:

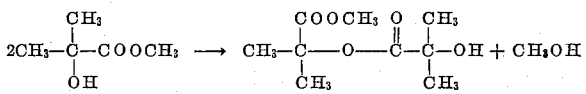

The above reaction thus proceeded as follows:

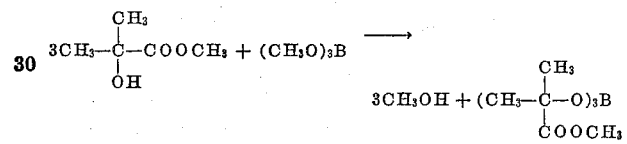

Although only the preparation of the borate of methyl alpha hydroxyisobutyrate was illustrated, other alkyl borates may be prepared in a like manner. Likewise, instead of methyl borate, other normal alkyl borates, such as ethyl borate may also be employed. The n-alkyl borate employed, however, must contain less or fewer carbon atoms than the tertiary alcohol used. The above reaction produces the desired alkyl borate and an alcohol. In order that the reaction go to completion, it is necessary to continuously remove at least one of the products of the reaction and, preferably, the alcohol formed. The alcohol produced depends upon the n-alkyl borate employed. This lower alcohol produced during the reaction is preferably removed therefrom by distilling it off as a low-boiling azeotrope with a volatile liquid organic compound. The volatile liquid organic compound employed must be one which is inert to the reaction and which forms with the lower alcohol an azeotrope with a boiling point below that of the reactants, i. e., the tertiary alcohol and n-alkyl borate. When methyl alpha hydroxyisobutyrate and methyl borate are the reactants and methanol is produced therefrom, the preferred volatile liquid organic compound is pentane. Other suitable volatile liquid organic compounds for forming low-boiling azeotropes with methanol or ethanol may be employed.

The reaction is carried out at elevated temperatures and preferably at or slightly above the boiling point of the lower alcohol-volatile liquid organic compound azeotrope so as to remove the azeotrope from the reaction mixture.

Since certain changes may be made in the above product and process without departing from the scope of the invention herein involved, it is intended that all material contained in the above description shall be interpreted as illustrative and not in a limiting sense.

What is claimed is:

1. A method for preparing the borate of methyl alpha hydroxyisobutyrate which comprises reacting at elevated temperatures in a reaction zone a mixture comprising methyl alpha hydroxyisobutyrate and a normal alkyl borate having fewer carbon atoms than said methyl alpha hydroxyisobutyrate in the presence of pentane to produce the borate of methyl alpha hydroxyisobutyrate and a normal alkyl alcohol, said pentane forming with said normal alkyl alcohol an azeotrope having a boiling point below that of said methyl alpha hydroxyisobutyrate and said normal alkyl alcohol, continuously distilling said azeotrope from the reaction zone, and recovering from the reaction zone the borate of methyl alpha hydroxyisobutyrate.

2. A method for preparing the borate of methyl alpha hydroxyisobutyrate which comprises reacting at elevated temperatures in a reaction zone a mixture comprising methyl alpha hydroxyisobutyrate and methyl borate in the presence of pentane to produce the borate of methyl alpha hydroxyisobutyrate and methanol, said pentane forming with said methanol an azeotrope having a boiling point below that of said methyl alpha hydroxyisobutyrate and said methanol, continuously distilling said azeotrope from the reaction zone, and recovering from the reaction zone the borate of methyl alpha hydroxyisobutyrate.

3. The method of claim 2 wherein the reaction is carried out at the boiling point of the reaction mixture.

References Cited in the file of this patent

UNITED STATES PATENTS 2,587,753    O'Connor et al. _____ Mar. 4, 1952
2,642,453    Lippincott _____ June 16, 1953

OTHER REFERENCES

Thomas: Chemical Soc. Jour. (London) 1946, pp. 820–822 (only page 822 relied on).

Gerrard et al.: Chemistry and Industry (London) 1952, pp. 53–55 (only page 54 relied on).

Horsley et al.: "Azeotropic Data," publ. by American Chemical Society (1952), Washington, D. C. (p. 30 relied on).